United States Patent
Gong et al.

(10) Patent No.: US 9,820,304 B2
(45) Date of Patent: Nov. 14, 2017

(54) TRANSMISSION RULES WITHIN A TXOP FOR WIDER BANDWIDTH OPERATION

(75) Inventors: Michelle X. Gong, Sunnyvale, CA (US); Robert J. Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/040,821

(22) Filed: Mar. 4, 2011

(65) Prior Publication Data

US 2012/0177017 A1 Jul. 12, 2012

Related U.S. Application Data

(60) Provisional application No. 61/431,726, filed on Jan. 11, 2011.

(51) Int. Cl.
*H04W 74/08* (2009.01)
*H04W 28/20* (2009.01)

(52) U.S. Cl.
CPC ........ *H04W 74/0816* (2013.01); *H04W 28/20* (2013.01)

(58) Field of Classification Search
CPC ........................ H04W 74/0816; H04W 28/20
See application file for complete search history.

(56) References Cited

U.S. PATENT DOCUMENTS

| | | | | |
|---|---|---|---|---|
| 2008/0316981 A1* | 12/2008 | Trainin | ................. | H04L 5/1453 370/338 |
| 2009/0213767 A1 | 8/2009 | Trainin et al. | | |
| 2011/0194644 A1* | 8/2011 | Liu et al. | ...................... | 375/295 |
| 2012/0082147 A1* | 4/2012 | Liu et al. | ...................... | 370/338 |
| 2012/0106426 A1* | 5/2012 | Hart et al. | .................... | 370/312 |
| 2012/0134324 A1* | 5/2012 | Chu | ................. | H04W 74/0816 370/329 |

(Continued)

OTHER PUBLICATIONS

Minho Jung, "Key Technology Issues for IEEE802.11ac Next Gen. WLAN," Jun. 28, 2010, ETRI.*

(Continued)

*Primary Examiner* — Jae Y Lee
(74) *Attorney, Agent, or Firm* — Schwegman Lundberg & Woessner, P.A.

(57) ABSTRACT

A method of communicating in a wireless network comprises controlling a bandwidth or a transmission mask of a PPDU transmitted by a transmitting STA to a receiving STA within a TXOP based on bandwidth information in at least one preceding frame within the TXOP. The method and associated devices allow a control of TXOP bandwidth or transmission mask where devices capable of both dynamic and static bandwidth operation may be present within the network. The preceding frame may include a non-HT frame of a non-HT duplicate frame exchange, such as a non-HT duplicate RTS/CTS exchange or a BAR/BA exchange, where the bandwidth or the transmission mask would be controlled by being limited to be less than or equal to a bandwidth of the non-HT frame. The preceding frame may include a preceding PPDU, where the bandwidth or the transmission mask would be limited to be less than or equal to a bandwidth of the preceding PPDU.

39 Claims, 8 Drawing Sheets

(56) References Cited

U.S. PATENT DOCUMENTS

2012/0177017 A1* 7/2012 Gong et al. .................. 370/338

OTHER PUBLICATIONS

Key Technology Issues for IEEE802.11ac Next Gen. WLAN, Jun. 28, 2010, ETRI.*
Minho Jung, "Key Technology Issues for IEEE802.11 ac Next Gen. WLAN," Jun. 28, 2010, ETRI.*
Chu et al., "80MHz/160MHz Protection," Sep. 7, 2010, IEEE.*
IEEE 802. 11-10/1289r2 "RTS/CTS Operation for Wider Bandwidth," Nov. 9, 2010, IEEE.*

* cited by examiner

TRANSMISSION RULES WITHIN A TXOP FOR WIDER BANDWIDTH OPERATION

BACKGROUND

Within a wireless network, some wireless stations (STAB) may be capable of dynamic bandwidth operation, that is, be able to adaptively and in real time transmit over various bandwidths depending on channel conditions on a per packet basis. Thus, a STA capable of dynamic bandwidth operation may transmit over a range of channel bandwidths, such as, for example, over channels with a 20, 40, 80, or 160 MHz bandwidth, for example composed of multiple subchannels having a bandwidth of 20 MHz each, depending on channel bandwidth availability within the network. Other STAB may be capable only of static bandwidth operation, in that they are able to transmit only over a given channel bandwidth (for example a channel this is either 20 or 40 or 80 or 160 MHz wide) without variation from packet to packet, and are not able to respond to channel conditions by changing their operation bandwidth. Thus, STAB capable only of static bandwidth operation will not transmit if any of the secondary subchannels is sensed busy. Where STAB operating in a dynamic bandwidth mode are operating within a wireless network, some PPDUs may be corrupted, and some PPDUs may be sent without the full available bandwidths being used. There is thus a need to provide mechanisms to optimize transmissions in an environment including STAB operating in a dynamic operating mode.

BRIEF DESCRIPTION OF THE DRAWINGS

Some embodiments of the invention may be better understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a computer-readable medium, which may be read and executed by one or more processors to enable performance of the operations described herein. A computer-readable medium may include any mechanism for storing information in a form readable by one or more computers. For example, a computer-readable medium may include a tangible storage medium, such as but not limited to read only memory (ROM); random access memory (RAM); magnetic disk storage media; optical storage media; a flash memory device, etc.

The term "wireless" may be used to describe circuits, devices, systems, methods, techniques, communications channels, etc., that communicate data by using modulated electromagnetic radiation through a non-solid medium. The term does not imply that the associated devices do not contain any wires. A wireless device may comprise at least one antenna, at least one radio, at least one memory, and at least one processor, where the radio transmits signals through the antenna that represent data and receives signals through the antenna that represent data, while the processor may process the data to be transmitted and the data that has been received. The processor may also process other data which is neither transmitted nor received.

A "STA" may be embodied in a wireless communication station, a mobile station, an advanced station, a client, a platform, a wireless communication device, a wireless AP, a modem, a wireless modem, a Personal Computer (PC), a desktop computer, a mobile computer, a laptop computer, a notebook computer, a tablet computer, a server computer, a set-top box, a handheld computer, a handheld device, a Personal Digital Assistant (PDA) device, a handheld PDA device, and/or a netbook.

Alternately or in combination, the STAB or platforms can also use signals to communicate in a wireless network such as a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing Next Generation mmWave (NGmS-D02/r0, Nov. 28, 2008), Wireless Gigabit Alliance (WGA), IEEE 802.11, 802.11a, 802.11b, 802.11e, 802.11g, 802.11 h, 802.11i, 802.11n, 802.11ac, 802.16, 802.16d, 802.16e standards and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Maximum Ratio Combining (MRC) transceiver or device, a transceiver or device having "smart antenna" technology or multiple antenna technology, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), OFDMA, Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth®, ZigBee™, or the like. Embodiments may be used in various other apparatuses, devices, systems and/or networks.

In one embodiment, STAB or platforms in a wireless network may operate in accordance with one or more of the IEEE 802.11 standards and/or protocol under development by associated task groups such as 802.11 ac. A STA operating in accordance with these protocols and/or standards may require the implementation of at least two layers. One layer is the 802.11 MAC layer (i.e., OSI Data/Link Layer 2). Another layer is the 802.11 PHY layer (i.e., OSI Physical Layer 1). The MAC layer may be implemented using either or a combination of dedicated hardware and dedicated software. The PHY layer may be implemented using dedicated hardware or through software emulation.

As used within this document, a 'channel' has a frequency spectrum (a range of frequencies specified for wireless communications) over which various devices are permitted to wirelessly communicate. A 'wide' channel is a channel whose frequency spectrum covers the frequency spectrums of multiple contiguous 'narrow' subchannels. In this context, the adjectives 'wide' and 'narrow' are defined with respect to each other, but not with respect to any other standard of absolute measurement. In some embodiments, the narrow subchannels each have a bandwidth of 20 megahertz (MHz), and the associated wide channel has a bandwidth that is an integer multiple of 20 MHz, but other embodiments may be based on narrow subchannels with other bandwidths.

According to some embodiments, a transmitting STA that is a TXOP holder in a wireless network may be adapted to control a bandwidth or a transmission mask of a PPDU within the TXOP based on bandwidth information contained in at least one preceding frame within the TXOP. According to a first embodiment, the preceding frame may be part of a non-HT duplicate frame exchange within the TXOP, and, according to a second embodiment, the preceding frame may be a PPDU.

The "non-HT" signifies that each RTS frame of the duplicate frame is not a "high-throughput" frame, that is, it occupies a 20 MHz bandwidth of the wide channel. The RTS frame is duplicated for each 20 MHz band of the wide channel (e.g. 80 MHz or 160 MHz) to ensure that a TXOP may be obtained for the maximum number of available bands within the wide channel for communication with the receiving STA. The non-HT duplicate RTS frame is shown as also having been transmitted over a 20 MHz secondary subchannel that exhibits interference with respect to the receiving STA, to the extent that the transmitting STA may send an RTS before it has information of interference at the receiving STA. By "non-HT frame," what is meant is either a non-HT duplicate frame, or merely a non-HT frame that exists on the primary channel. Thus, by non-HT CTS frame, what is meant is either a single non-HT CTS frame sent over the primary subchannel, or a non-HT duplicate CTS frame sent over multiple subchannels. By "non-HT duplicate frame," what is meant is the set of non-HT frames that are duplicated on the subchannels. By "non-HT duplicate frame exchange," what is meant is a frame exchange where at least one component includes a non-HT duplicate frame, such as for example a non-HT duplicate RTS frame followed by a single non-HT CTS response.

In the first embodiment, if there is at least one non-HT duplicate frame exchange in a TXOP, a transmitting STA that is the TXOP holder may transmit PPDUs using a bandwidth that is the same or narrower than a bandwidth used in a first one of the non-HT duplicate frame exchanges within the same TXOP. Where the non-HT duplicate frame exchange involves a non-RTS/CTS exchange in a TXOP, such as, for example, where the non-HT duplicate frame exchange involve a BAR/BA exchange, for example, the transmitting STA that is the TXOP holder may transmit PPDUs using a bandwidth that is the same or narrower than the bandwidth of the first BAR/BA exchange used in the TXOP. On the other hand, where the non-HT duplicate frame exchange involves a RTS/CTS exchange in a TXOP, the bandwidth for the TXOP may be set to be less than or equal to the bandwidth indicated in the CTS frame (i.e. the bandwidth at which the receiving STA is able to communicate), or, in the alternative, less than or equal to the bandwidth indicated in the RTS frame (i.e. the bandwidth at which the transmitting STA is able to communicate).

In the second embodiment, where the TXOP is not obtained through a non-HT duplicate frame exchange, the transmitting STA that is the TXOP holder may obtain a TXOP, and, for the duration of the TXOP, may limit the maximum bandwidth or transmission mask of each subsequent PPDU to a bandwidth used for a preceding PPDU frame within the TXOP. In this way, when the transmitting STA that is the TXOP holder transmits a PPDU with a given bandwidth, for example, a narrower bandwidth than originally obtained for the TXOP, for any subsequent PPDU in the TXOP, either the bandwidth or the transmission mask cannot be wider than the narrower bandwidth PPDU.

Examples for the above embodiments will be described further below as the description progresses.

Figure 1:
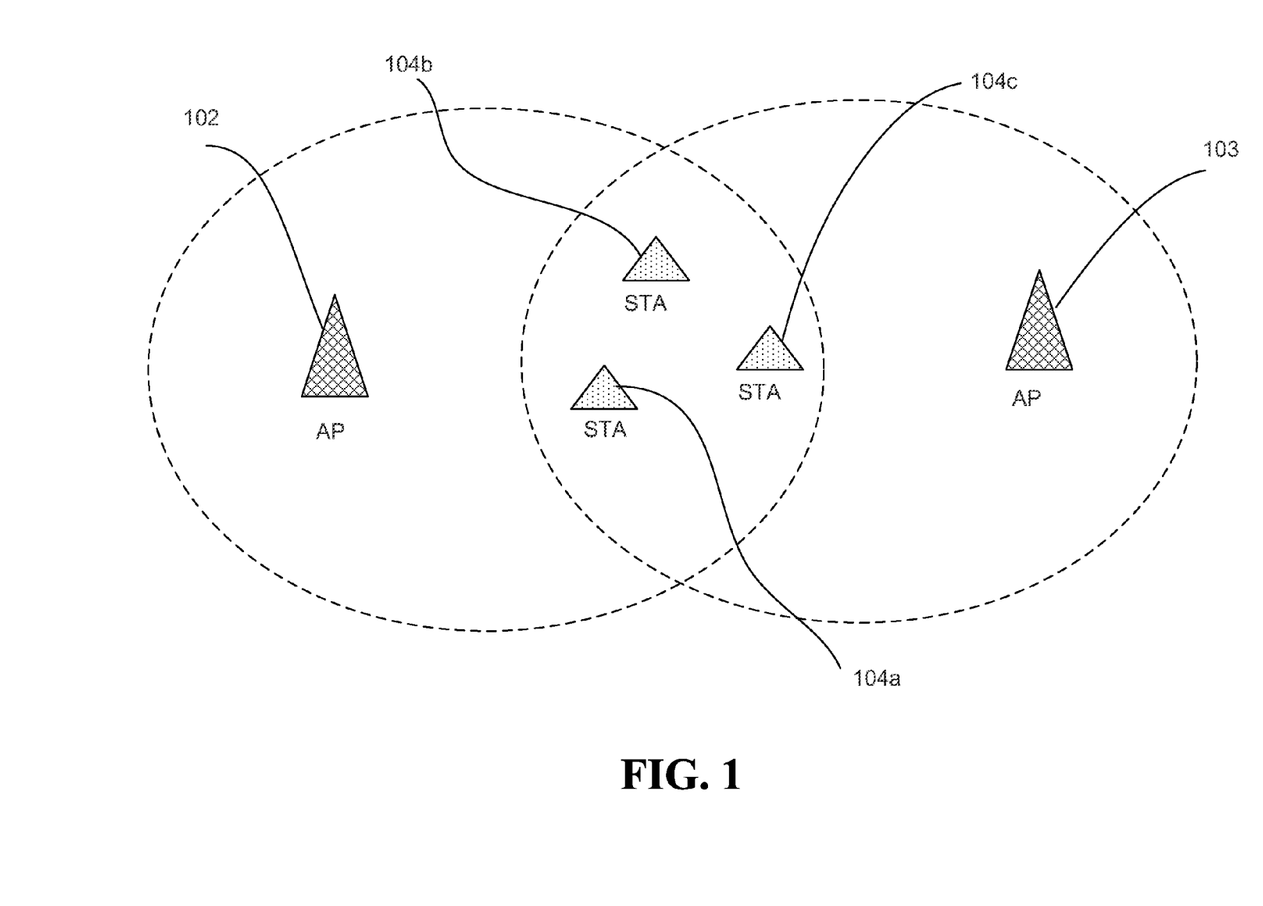
FIG. 1 shows a wireless communications network, according to an embodiment of the invention.

As illustrated in FIG. 1, wireless network 100 comprises transmitting stations (STA) 102, such as, for example, a wireless access point (AP), and one or more of a plurality of receiving STAB (STAB) 104a, 104b, 104c. Transmitting STA 102 may provide for communication to associated receiving STAB 104a-c and may allow associated receiving STAB 104a-c to communicate with one or more external networks, such as the Internet. STA 102 may be capable of dynamic bandwidth operation, that is, be able to transmit over a range of channel bandwidths, such as, for example, over channels with a 40, 80, or 160 MHz bandwidth (each composed of multiple subchannels having a bandwidth of 20 MHz each for example) depending on channel bandwidth availability within the network. For a STA with dynamic bandwidth capability, if an 80 MHz bandwidth is free, the transmitting STA may transmit using 80 MHz. Otherwise, if a 40 MHz bandwidth is free, the transmitting STA may transmit using 40 MHz, and if a secondary subchannel is not free, the transmitting STA may transmit using only the primary subchannel. Receiving STAB 104a-c are each assumed to be recent-technology devices that can communicate with the transmitting STA or AP 102 over a wide channel. In the event that any receiving STA is not capable of VHT communication, the AP may not transmit to them, the AP may not transmit to such a STA, having learned of its inability to operate in VHT mode for example through the STA's association request frame. Each device (the transmitting STA and receiving STAB) may include a processor, memory, a radio, and one or more antennas to facilitate their wireless communications. FIG. 1 also shows a hidden node transmitting STA or HN STA 103, which is a hidden node with respect to transmitting STA 102, while receiving STAB 104a-c can hear transmissions from both STA 102 and STA 103.

As noted previously, in some embodiments, transmitting STA 102 may be a wireless access point (AP), such as a Wireless Fidelity (WiFi), Worldwide Interoperability for Microwave Access (WiMax), or broadband communication station, although the scope of the invention is not limited in this respect as transmitting STA 102 may be almost any communication station. In some embodiments, receiving STAB 104a-c may be communication stations (STAB) or mobile STAB such as WiFi, WiMax, or broadband communication stations, although the scope of the invention is not limited in this respect.

Figure 2:
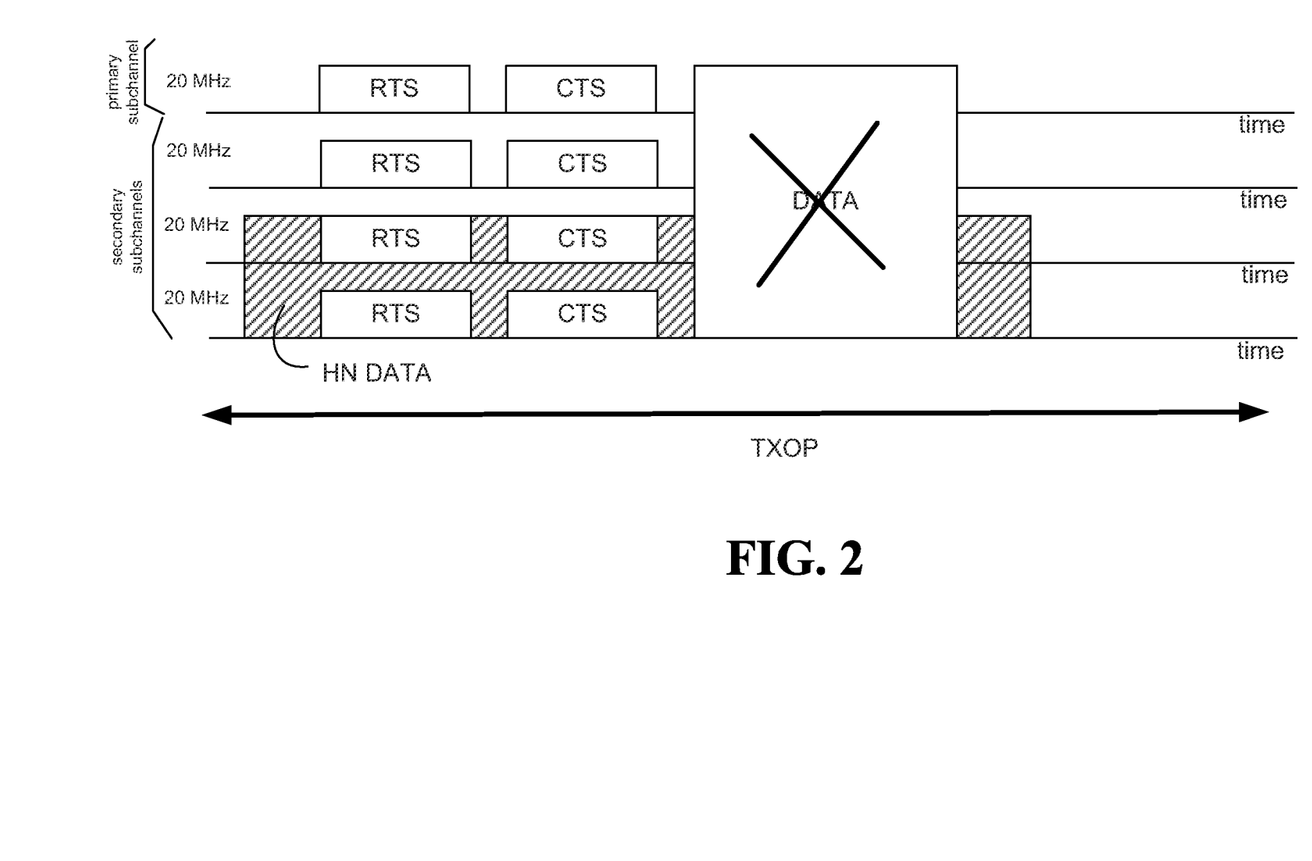
FIG. 2 shows a partially unsuccessful communication sequence in a legacy wireless network.

FIG. 2 shows a partially unsuccessful communication sequence in a legacy wireless network where the transmitting STA, such as transmitting STA 102 of FIG. 1, is capable of dynamic bandwidth operation. In FIG. 2, as in FIGS. 3-6 the description of which will follow, the vertical axis represents frequency, in which four contiguous 20 MHz narrow subchannels occupy the same bandwidth as a single 80 MHz wide channel. The horizontal axis represents time, during which the transmitting STA may transmit a downlink frame to a receiving STA, such as one of receiving STAB 104a-c, over the wide channel, and the addressed receiving STA may respond with an uplink frame to the transmitting STA. As used in this document, and in keeping with common industry practice, the term 'downlink' refers to a communication transmitted from a transmitting STA to one or more receiving STAB, while the term 'uplink' refers to a communication transmitted from a receiving STA to the transmitting STA. As seen in FIG. 2, under current RTS/CTS rules for wider channels, a transmitting STA sends a non-HT duplicate RTS frame over all available subchannels, in this case over the primary 20 MHz subchannel and the three secondary 20 MHz subchannels. After a SIFS time interval, the receiving STA may then transmit non-HT duplicate CTS frames on the very same bandwidths occupied by the non-HT duplicate RTS frames. If the transmitting STA receives a CTS on the primary subchannel, it then responds with a PPDU in the form of a data transmission (marked "DATA" in FIG. 2) on all subchannels. This is because a legacy transmitting STA can decode frames only over the primary subchannel. However, the legacy system as described above does not account for hidden node collisions on the secondary subchannels, as shown in FIG. 2, where transmissions on the secondary subchannels by a hidden node (marked "HN DATA" in FIG. 2) may result in a collision with the PPDU sent by the transmitting STA.

Figure 3A:
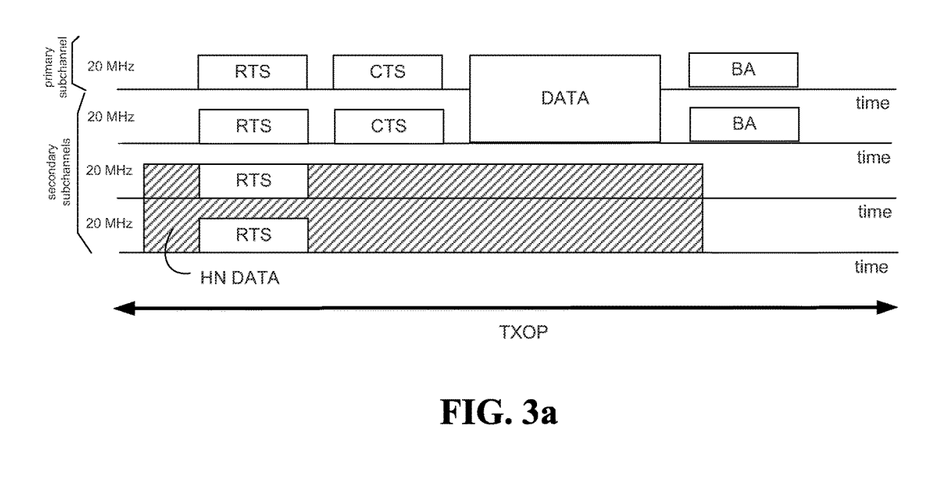
FIG. 3a shows a communication sequence, according to a first embodiment of the invention where a transmitting STA is capable of dynamic bandwidth operation.

FIG. 3a shows an example of a communication sequence according to a first embodiment, which embodiment is meant to address the problems addressed in FIG. 2. Here, the bandwidth of PPDUs within a TXOP may be based on a bandwidth indicated in a non-HT duplicate RTS/CTS exchange within that same TXOP. Thus, according to this embodiment, before a downlink transmission occurs from transmitting STA 102 to a designated one of the receiving STA's 104a-c, transmitting STA 102 may transmit a non-HT duplicate RTS frame as shown in FIG. 2 to the designated receiving. The non-HT duplicate RTS frame may, according to an embodiment, specify: (1) whether, yes or no, the transmitting STA is operating in a dynamic bandwidth operation mode, and (2) the bandwidth of the non-HT duplicate RTS frame, that is, the bandwidth available to the transmitting STA for communicating with the designated receiving STA, in a "bandwidth indication field" of the RTS frame. Thus, an RTS frame according to an embodiment may have two more fields than the legacy 802.11 RTS frame: a dynamic bandwidth operation mode field (indicating whether transmitting STA is operating in a dynamic bandwidth operation mode, or not), which could, for example, occupy one bit, and a bandwidth indication field (indicating bandwidths over which the transmitting STA may transmit), which could, for example occupy two bits, to for example indicate 20/40/80/160 MHz. In the shown example of FIG. 3a, the transmitting STA is one that is capable of operating in a wide channel environment, 80 MHz in this case as shown by the four non-HT duplicate RTS frames each occupying a 20 MHz bandwidth. In the case of FIG. 3a, therefore, the bandwidth operation capability field of the shown RTS frame would correspond t one bit set to 1 (for yes), and the bandwidth indication field of the RTS frame would correspond to two bits indicating the bandwidth currently being used by the non-HT duplicate RTS frame (all RTS frames together).

Referring still to FIG. 3a, after completion of the non-HT duplicate RTS frame transmission from the transmitting STA, the addressed receiving STA may respond with a non-HT clear to send (CTS) frame. For a receiving STA which responds with a CTS frame, the instant description will hereinafter use the expression "responding STA." The CTS frame may be sent at least on the primary subchannel if sensed idle to indicate that the responding STA successfully received the non-HT duplicate RTS frame. In addition to the primary subchannel, one or more of the secondary subchannels indicated in the bandwidth indication field of the RTS frame may further be used by the responding STA for communication of a non-HT duplicate CTS frame to the transmitting STA. Whether or not such secondary subchannels are used for further CTS communication depends on whether or not any of the secondary subchannels indicated in the bandwidth indication field of the RTS frame are determined by the responding STA to be idle, this determination being made for example during the PIFS time interval before the non-HT duplicate RTS frame is received by the responding STA in a well known manner, for example by using CSMA/CA physical carrier sensing performed by the receiving STA before the non-HT duplicate RTS frame is received by the receiving STA. The CTS frame is duplicated for each 20 MHz band or subchannel of the 80 MHz wide channel that is determined to be idle by the responding STA to ensure that a TXOP may be obtained for the maximum number of available bands within the wide channel for communication with the transmitting STA to which the non-HT duplicate CTS frames are addressed. Thus, non-HT duplicate CTS frames may be transmitted over all 20 MHz subchannels that lie within a bandwidth as indicated in the CTS frame. That is, the CTS frame, similar to the RTS frame, may include a bandwidth indication field, which, in the case of the CTS frame, indicates which bandwidths/subchannels are idle for transmission by the transmitting STA to the responding STA.

In the shown example of FIG. 3a, the responding STA may be a receiving STA that is capable of handling VHT traffic, and sends non-HT duplicate CTS frames each occupying a 20 Hz bandwidth over 40 MHz including the primary subchannel in response to the non-HT duplicate RTS frame and based on the subchannels that were sensed idle. After the transmitting STA successfully receives the non-HT duplicate CTS frame from the responding STA, a TXOP may be obtained for a transmission from the transmitting STA to the responding STA. According to some embodiments, a TXOP obtained for a transmission from the transmitting STA to the receiving STA may be determined based on the bandwidth indicated in the CTS frame. When a TXOP is obtained for a bandwidth that is greater than 20 MHz, according to one embodiment, the transmitting STA may transmit data using a transmission vector parameter CH_BANDWIDTH (an instruction to the PHY layer to transmit in a certain bandwidth on a per packet basis) that is up to and including the greater than 20 MHz bandwidth obtained for the TXOP. Thus, for example, for a TXOP bandwidth of 80 MHz, the parameter CH_BANDWIDTH may for example be set to 20 MHz, 40 MHz, 80 MHz or 160 MHz. During the TXOP, the transmitting STA may not transmit data using the parameter CH_BANDWIDTH that is greater than the bandwidth obtained for the TXOP. In the alternative, after a TXOP is obtained, the transmitting STA may transmit data (marked "DATA" in FIG. 3a) to the receiving/responding STA not by limiting the CH_BANDWIDTH as explained above, but rather according to tighter constraints, by using the bandwidth in a preceding frame to set the maximum bandwidth constraints for the PPDU transmission mask. The transmission mask may thus for example be set to be less than or equal to the bandwidth indicated in the non-HT CTS frame. A "receiving/responding STA" as used herein refers to a receiving STA that has successfully transmitted a CTS frame is now about to receive or receiving a PPDU from the transmitting STA.

After completion of the PPDU from the transmitting STA to the receiving/responding STA, the receiving/responding STA may transmit non-HT duplicate block acknowledgement frames (BAs), either in non-HT duplicate format as shown in FIG. 3a, or in a VHT format (not shown) using for example the same transmission mask as used for the PPDU. In the shown example of FIG. 3a, the receiving/responding STA transmits a non-HT duplicate BA frame duplicated over two 20 MHz bands of the available 40 MHz channel.

Figure 3B:
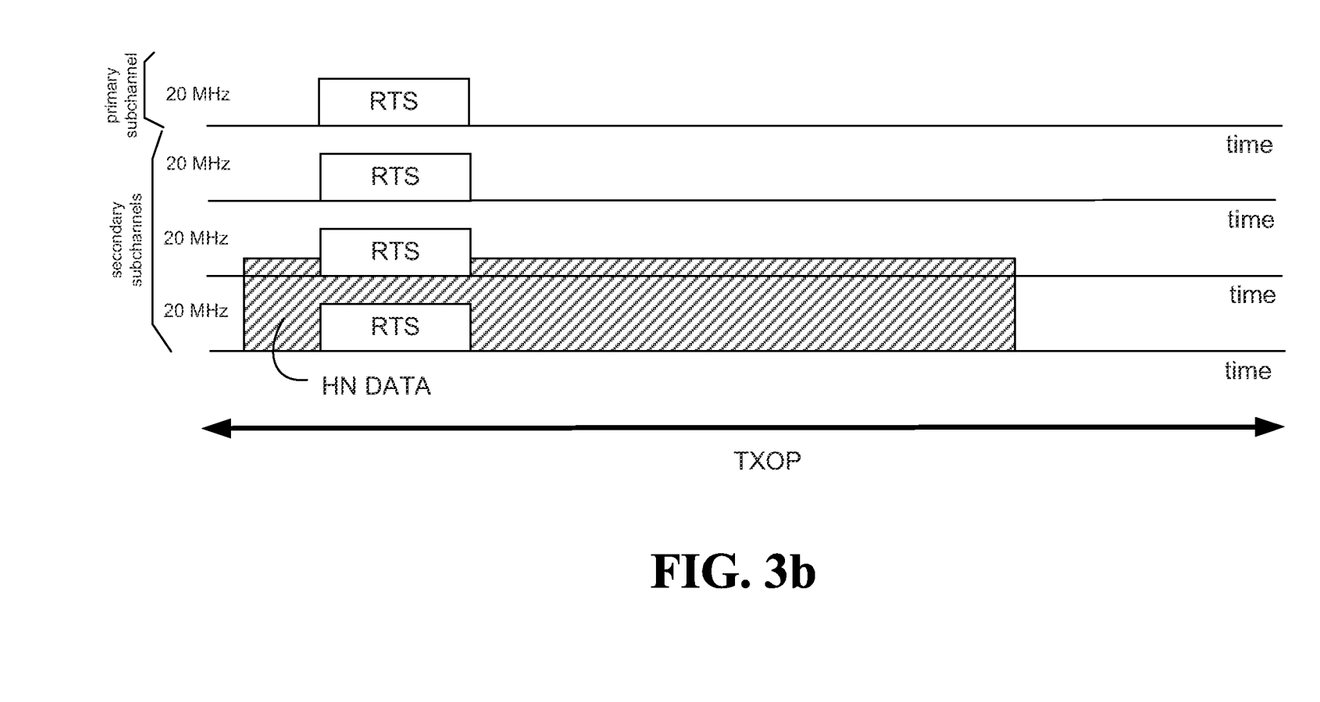
FIG. 3b shows a communication sequence according to the first embodiment of the invention, where a transmitting STA is not capable of dynamic bandwidth operation.

In the event that the dynamic bandwidth operation bit of a non-HT duplicate RTS frame according to the first embodiment is set to 0, as shown in FIG. 3b, that is, in the event that the transmitting STA is not in a dynamic bandwidth operation mode, upon receiving the non-HT duplicate RTS frame, a receiving STA addressed by the RTS frame may respond with a CTS frame, according to the first embodiment, but only when all of the secondary subchannels are determined by the receiving STA to be idle. This is because the transmitting STA, by virtue of its static bandwidth operation mode, would not be able to transmit PPDUs to a receiving STA in any event on a narrower bandwidth if some of the secondary subchannels are not idle.

Referring still to the first embodiment, a transmitting STA may further transmit a non-HT duplicate CF-End frame over the subchannels that have been indicated in the CTS frame to terminate the TXOP. In this case, all three control frames, that is, the RTS, CTS and CF-End frames, may use the bandwidth indicated in the RTS frame as the transmission mask. Alternatively, the CTS and CF-End frames may use the bandwidth indicated in the CTS frame as the transmission mask.

Figure 4:
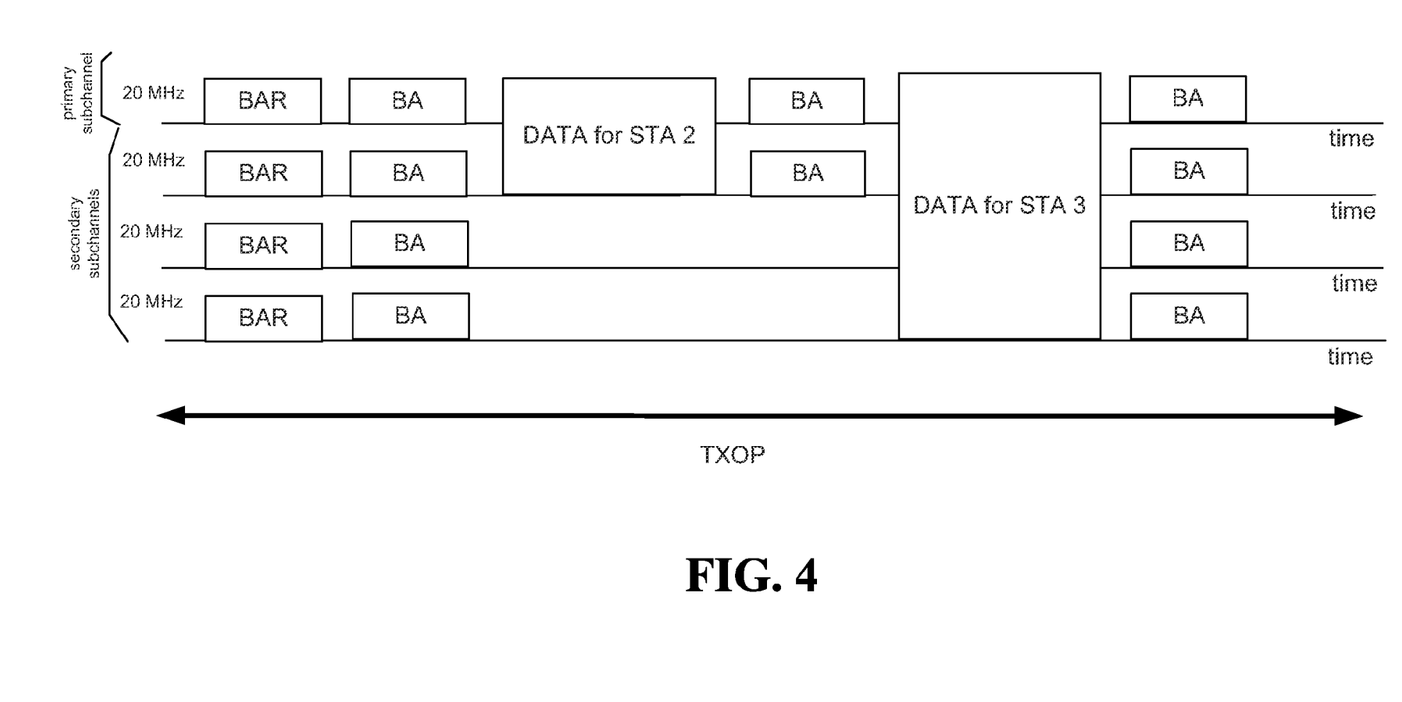
FIG. 4 shows a communication sequence, according to a variation of the first embodiment of the invention.

FIG. 4 shows an example of a communication sequence according to a modified version of the first embodiment, where the bandwidth of PPDUs within a TXOP may be based on a bandwidth indicated in a first non-HT duplicate BAR/BA exchange within that same TXOP. In general, in a non-HT mode, identical and hence duplicate BAR frames may be sent on idle subchannels of the wide channel simultaneously. As seen in FIG. 4, the non-HT duplicate BAR frames may be sent for receipt by a responding STA on idle subchannels, and the responding STA in turn responds with BA frames which mirror the BAR frames in format and bandwidth. Thus, if the BAR frame is in VHT format, the BA frame will also be in VHT format, using the same bandwidth as the BA frame (not shown). Referring still to FIG. 4, the non-HT duplicate BAR/BA exchange may be used to announce the Network Allocation Vector (NAV) in a way readable by both devices having wide channel capability, and those not having wide channel capability. This sets up a time period during which third party stations should keep off the medium. In addition, according to the shown embodiment, to accommodate the dynamic situation noted previously, the transmitting STA that is the TXOP holder may transmit using the same or a narrower bandwidth than the bandwidth of the first non-HT duplicate frame exchange in the TXOP. In the case of the shown example of FIG. 4, the TXOP is shown to have set its bandwidth to 80 MHz, by virtue of the DATA to STA 3 transmission toward the end of the TXOP, which transmission has the same total bandwidth as that of the initial BAR/BA exchange. In addition, PPDUs may be transmitted within the TXOP with a narrower bandwidth as shown for example by "DATA for STA2" in FIG. 4. In this way, the TXOP holder has uninterrupted control of the medium for a duration set by the NAV, and at a maximum bandwidth as occupied by the first BAR/BA frame exchange, such as a first BAR/BA non-HT duplicate frame exchange.

Figure 5:
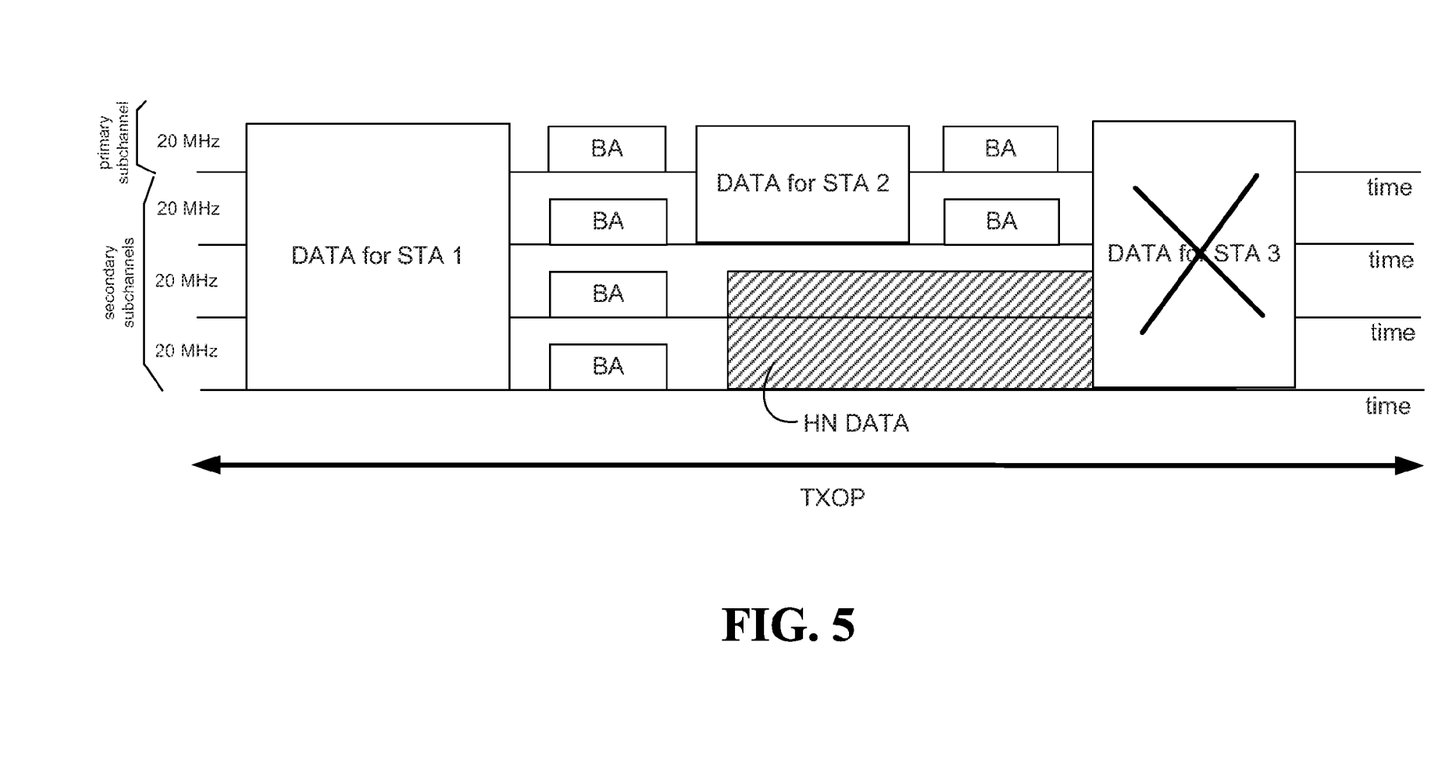
FIG. 5 shows a partially unsuccessful communication sequence in another legacy wireless network.

FIG. 5 shows a partially unsuccessful communication sequence in a legacy wireless network where the transmitting STA, such as transmitting STA 102 of FIG. 1, is capable of dynamic bandwidth operation, but where the TXOP is not obtained through a non-HT duplicate frame exchange. As seen in FIG. 5, in a given TXOP, a PPDU in the form of a data transmission may be sent to a first receiving STA, as shown by "DATA for STA1" in FIG. 5, using all available subchannels, including the primary 20 MHz channel and in the shown case, all existing 20 MHz secondary subchannels. After a SIFS time interval, the receiving STA may then transmit a block acknowledgment or BA frame, either as a non-HT duplicate frame, or as a VHT BA frame (not shown)). However, the legacy system as described may include a hidden node in the form of a third party transmitting STA that is not able to receive and decode information from a VHT frame, such as from the VHT DATA for STA1, and a NAV therefore cannot be set as a result. Such information may include the total bandwidth and duration allocated in the medium to the TXOP for the transmitting STA that is sending the DATA to STA1. In a legacy system, therefore, a third party transmitting STA may be blind to the allocated TXOP duration, and may start transmitting its own frames within the TXOP, for example after a time interval equal to EIFS plus a backoff period from the end of the transmission of the wide-bandwidth PPDU. This hidden node transmission is shown as "HN DATA" in FIG. 5. Should the transmitting STA that is the TXOP holder then transmit a wide-bandwidth PPDU within the TXOP, such as the wide-bandwidth "DATA for STA3," which data transmission is to use channel bandwidth occupied by HN DATA, a collision would occur as shown by the "X" on FIG. 5.

Figure 6:
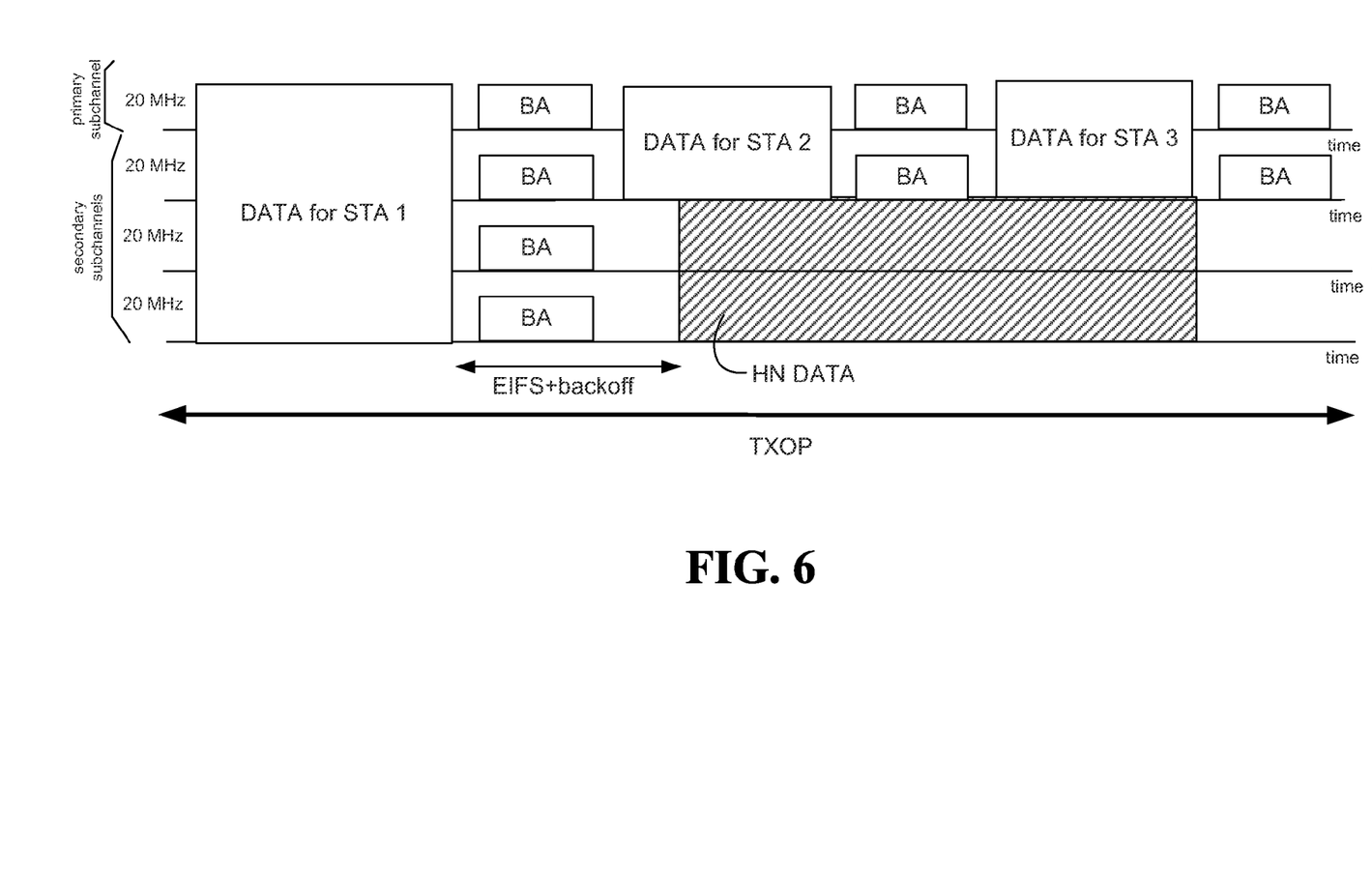
FIG. 6 shows a communication sequence according to a second embodiment.

As seen in FIG. 6, according to a second embodiment, where there is no non-HT duplicate frame exchange in a TXOP, once the TXOP holder transmits using a narrower bandwidth within that TXOP, for any subsequent transmissions within the TXOP, the transmitting STA cannot transmit anything wider than such narrower bandwidth. Thus, referring to FIG. 6, a DATA for STA1 is first transmitted in a wide-bandwidth format. The first PPDU is shown as taking up a bandwidth of 80 MHz. Thereafter a narrow bandwidth PPDU, that is, a DATA for STA2, is transmitted at a bandwidth of 40 MHz only. A BA frame is received after each PPDU, either in non-HT duplicate format as shown, or in a wide-bandwidth format (now shown). According to this embodiment, to the extent that the PPDU bandwidth of the most recent transmission is narrower than that of the preceding transmission, and since virtual carrier sensing cannot be used to set the NAV, physical carrier sensing may be utilized to limit bandwidths (this embodiment) or transmission masks (not shown) available to a TXOP holder to only those bandwidths it has kept continuous control over during the TXOP. Thus, once a TXOP holder has given up control of certain subchannels during the TXOP, it can no longer reclaim them. As a result, as seen in FIG. 6, the last PPDU in the TXOP, that is, DATA for STA3, is limited to the bandwidth of the narrowest PPDU within the TXOP, that is, the bandwidth of DATA for STA2. In this way, a third party transmitting STA, once it senses the medium to be idle by virtue of the DATA for STA2 having a narrower bandwidth than the DATA for STA1, will be transmitting its data over the idle subchannels without causing collisions with the data being transmitted by the TXOP holder during the TXOP.

Figure 7:
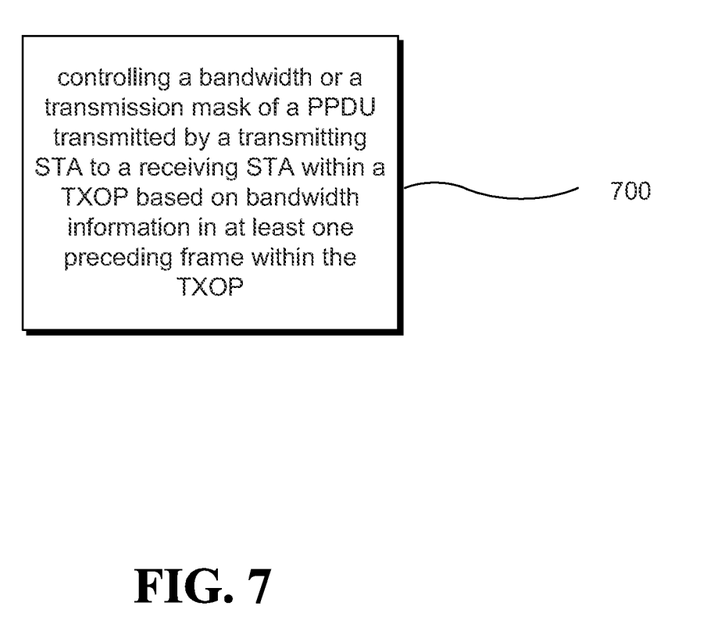
FIG. 7 shows a of a method for wireless communication according to an embodiment.

Referring next to FIG. 7, a method is shown including at block 700, controlling a bandwidth or a transmission mask of a PPDU transmitted by a transmitting STA to a receiving STA within a TXOP based on bandwidth information in at least one preceding frame within the TXOP.

The foregoing description is intended to be illustrative and not limiting. Variations will occur to those of skill in the art. Those variations are intended to be included in the various embodiments of the invention, which are limited only by the scope of the following claims.

What is claimed is:

1. An apparatus of a station (STA), the apparatus comprising: a memory; and, circuitry coupled to the memory, the circuitry configured to:
   decode a non-high-throughput (non-HT) duplicate request to send (RTS) frame, the non-HT duplicate RTS frame comprising an address of the STA;
   if the non-HT duplicate RTS frame indicates a static bandwidth, and if all secondary channels within a channel width of the non-HT duplicate RTS frame are idle for a priority interframe space (PITS) before receiving the non-HT duplicate RTS frame, encode a non-HT clear-to-send (CTS) for transmission on the channel width of the non-HT duplicate RTS frame; and
   if the non-HT duplicate RTS frame indicates a dynamic bandwidth, encode the non-HT CTS for transmission on each channel within the channel width of the non-HT duplicate RTS frame for which secondary channels are idle for the PIFS before receiving the non-HT duplicate RTS frame.

2. The apparatus of claim 1, wherein the secondary channels are one or more from the following group: a secondary 20 MHz channel, a secondary 40 MHz channel, and a secondary 80 MHz channel.

3. The apparatus of claim 1, wherein the circuitry is further configured to:
   configure the STA to transmit the non-HT CTS a short interface space (SIFS) after the non-HT duplicate RTS frame is received.

4. The apparatus of claim 1, wherein the circuitry is further configured to:
   if a network allocation vector (NAY) indicates idle, and if the non-HT duplicate RTS frame indicates the static bandwidth, and if all secondary channels within the channel width of the non-HT duplicate RTS frame are idle for the PITS before receiving the non-HT duplicate RTS frame, encode the non-HT CTS for transmission on the channel width of the non-HT duplicate RTS frame.

5. The apparatus of claim 1, wherein the circuitry is further configured to:
   if a network allocation vector (NAV) indicates idle, and if the non-HT duplicate RTS frame indicates the dynamic bandwidth, encode the non-HT CTS for transmission on any channel within the channel width of the non-HT duplicate RTS frame for which secondary channels are idle for the PITS before receiving the non-HT duplicate RTS frame.

6. The apparatus of claim 1, wherein the circuitry is further configured to determine which secondary channels are idle by performing physical carrier sensing on the secondary channels.

7. The apparatus of claim 1, wherein the non-HT CTS frame includes a bandwidth indication field indicating a bandwidth of the channel width or a bandwidth of each channel within the channel width of the non-HT duplicate RTS frame for which secondary channels are idle for the PIFS before receiving the non-HT duplicate RTS frame.

8. The apparatus of claim 1, wherein the non-HT duplicate RTS frame includes a field that indicates either the static bandwidth or the dynamic bandwidth.

9. The apparatus of claim 1, wherein the circuitry is further configured to:
   decode a separate non-HT RTS on each 20 MHz channel within the channel width of the non-HT duplicative RTS frame.

10. The apparatus of claim 1, wherein the circuitry is further configured to:
    if the non-HT duplicate RTS frame indicates a static bandwidth, and if all secondary channels within the channel width of the non-HT duplicate RTS frame are idle for the PIFS before receiving the non-HT duplicate RTS frame, encode a separate non-HT clear-to-send (CTS) for transmission on each 20 MHz channel within the channel width of the non-HT duplicate RTS frame.

11. The apparatus of claim 1, wherein the circuitry is further configured to:
    if the non-HT duplicate RTS frame indicates the dynamic bandwidth, encode the non-HT CTS for transmission on each channel within the channel width of the non-HT duplicate RTS frame for which secondary channels are idle for the PIFS before receiving the non-HT duplicate RTS frame.

12. The apparatus of claim 1, wherein the circuitry is further configured to;
if the non-HT duplicate RTS frame indicates the static bandwidth, and if one secondary channels within a channel width of the non-HT duplicate RTS frame is not idle for the PIFS before receiving the non-HT duplicate RTS frame, and if the non-HT duplicate RTS frame indicates the dynamic bandwidth, and each channel within the channel width of the non-HT duplicate RTS frame for which secondary channels is not idle for the PIFS before receiving the non-HT duplicate RTS frame, then not respond to non-HT duplicate RTS frame.

13. The apparatus of claim 1, wherein the STA is a HT STA or a HT access point.

14. The apparatus of claim 1, wherein the STA is configured to operate in accordance with Institute of Electrical and Electronic Engineers (IEEE) 802.1 Iac.

15. The apparatus of claim 1, further comprising: one or more antennas coupled to the circuitry.

16. A non-transitory computer-readable storage medium that stores instructions for execution by one or more processors, the instructions to configure the one or more processors to cause a station (STA) to:
decode a non-high-throughput (non-HT) duplicate request to send (RTS) frame, the non-HT duplicate RTS frame comprising an address of the STA,
if the non-HT duplicate RTS frame indicates a static bandwidth, and if all secondary channels within a channel width of the non-HT duplicate RTS frame are idle for a priority interframe space (PIFS) before receiving the non-HT duplicate RTS frame, encode a non-HT clear-to-send (CTS) for transmission on the channel width of the non-HT duplicate RTS frame; and
if the non-HT duplicate RTS frame indicates a dynamic bandwidth, encode the non-HT CTS for transmission on each channel within the channel width of the non-HT duplicate RTS frame for which secondary channels are idle for the PIFS before receiving the non-HT duplicate RTS frame.

17. The apparatus of claim 16, wherein the secondary channels are one or more from the following group: a secondary 20 MHz channel, a secondary 40 MHz channel, and a secondary 80 MHz channel.

18. The apparatus of claim 16, wherein the circuitry is further configured to:
configure the STA to transmit the non-HT CTS a short interface space (SITS) after the non-HT duplicate RTS frame is received.

19. The apparatus of claim 16, wherein the circuitry is further configured to:
if a network allocation vector (NAV) indicates idle, and if the non-HT duplicate RTS frame indicates the static bandwidth, and if all secondary channels within the channel width of the non-HT duplicate RTS frame are idle for the PIFS before receiving the non-HT duplicate RTS frame, encode the non-HT CTS for transmission on the channel width of the non-HT duplicate RTS frame.

20. The apparatus of claim 16, wherein the circuitry is further configured to:
if a network allocation vector (NAV) indicates idle, and if the non-HT duplicate RTS frame indicates the dynamic bandwidth, encode the non-HT CTS for transmission on any channel within the channel width of the non-HT duplicate RTS frame for which secondary channels are idle for the PIFS before receiving the non-HT duplicate RTS frame.

21. A method performed by an apparatus of a station (STA), the method comprising:
decoding a non-high-throughput (non-HT) duplicate request to send (RTS) frame, the non-HT duplicate RTS frame comprising an address of the STA;
if the non-HT duplicate RTS frame indicates a static bandwidth, and if all secondary channels within a channel width of the non-HT duplicate RTS frame are idle for a priority interframe space (PITS) before receiving the non-HT duplicate RTS frame, encoding a non-HT clear-to-send (CTS) for transmission on the channel width of the non-HT duplicate RTS frame; and
if the non-HT duplicate RTS frame indicates a dynamic bandwidth, encoding the non-HT CTS for transmission on each channel within the channel width of the non-HT duplicate RTS frame for which secondary channels are idle for the PITS before receiving the non-HT duplicate RTS frame.

22. The method of claim 21, wherein the secondary channels are one or more from the following group: a secondary 20 MHz channel, a secondary 40 MHz channel, and a secondary 80 MHz channel.

23. The method of claim 21, the method further comprising:
configuring the STA to transmit the non-HT CTS a short interface space (SIFS) after the non-HT duplicate RTS frame is received.

24. An apparatus of a station (STA), the apparatus comprising: a memory; and, circuitry coupled to the memory, the circuitry configured to:
decode a request-to-send (RTS) frame in a non-high-throughput (non-HT) physical (PHY) Layer Convergence Procedure (PLCP) protocol data unit (PPDU) or non-HT duplicate PPDU, the RTS frame comprising an address of the STA;
if the RTS frame indicates a static bandwidth, and if all secondary channels within a channel width of the RTS frame are idle for a priority interframe space (PITS) before receiving the RTS frame, encode a clear-to-send (CTS) frame in a non-HT PPDU or a non-HT duplicate PPDU for transmission on the channel width of the RTS frame; and
if the RTS frame indicates a dynamic bandwidth, encode the CTS frame in the non-HT PPDU or the non-HT duplicate PPDU for transmission on each channel within the channel width of the RTS frame for which secondary channels are idle for the PIFS before receiving the non-HT duplicate RTS frame.

25. The apparatus of claim 24, wherein the secondary channels are one or more from the following group: a secondary 20 MHz channel, a secondary 40 MHz channel, and a secondary 80 MHz channel.

26. The apparatus of claim 24, wherein the circuitry is further configured to:
configure the STA to transmit the CTS frame a short interface space (SIFS) after the RTS frame is received.

27. The apparatus of claim 24, wherein the circuitry is further configured to:
if a network allocation vector (NAY) indicates idle, and if the RTS frame indicates the static bandwidth, and if all secondary channels within the channel width of the RTS frame are idle for the PITS before receiving the RTS frame, encode the CTS frame in the non-HT PPDU or the non-HT duplicate PPDU for transmission on the channel width of the RTS frame.

28. The apparatus of claim 24, wherein the circuitry is further configured to:
if a network allocation vector (NAY) indicates idle, and if the RTS frame indicates the dynamic bandwidth, encode the CTS frame in the non-HT PPDU or the non-HT duplicate PPDU for transmission on each channel within the channel width of the RTS frame for which secondary channels are idle for the PIFS before receiving the non-HT duplicate RTS frame.

29. The apparatus of claim 24, wherein the circuitry is further configured to determine which secondary channels are idle by performing physical carrier sensing on the secondary channels.

30. The apparatus of claim 24, wherein the STA is a HT STA or a HT access point, and wherein the STA is configured to operate in accordance with Institute of Electrical and Electronic Engineers (IEEE) 802.11ac.

31. A non-transitory computer-readable storage medium that stores instructions for execution by one or more processors, the instructions to configure the one or more processors to cause a station (STA) to:
decode a request-to-send (RTS) frame in a non-high-throughput (non-HT) physical (PHY) Layer Convergence Procedure (PLOP) protocol data unit (PPDU) or non-HT duplicate PPDU, the RTS frame comprising an address of the STA;
if the RTS frame indicates a static bandwidth, and if all secondary channels within a channel width of the RTS frame are idle for a priority interframe space (PIPS) before receiving the RTS frame, encode a clear-to-send (CTS) frame in a non-HT PPDU or a non-HT duplicate PPDU for transmission on the channel width of the RTS frame; and
if the RTS frame indicates a dynamic bandwidth, encode the CTS frame in the non-HT PPDU or the non-HT duplicate PPDU for transmission on each channel within the channel width of the RTS frame for which secondary channels are idle for the PIPS before receiving the non-HT duplicate RTS frame.

32. The non-transitory computer-readable storage medium of claim 31, wherein the instructions further configure the one or more processors to cause the STA to:
if a network allocation vector (NAV) indicates idle, and if the RTS frame indicates the static bandwidth, and if all secondary channels within the channel width of the RTS frame are idle for the PIPS before receiving the RTS frame, encode the CTS frame in the non-HT PPDU or the non-HT duplicate PPDU for transmission on the channel width of the RTS frame.

33. The non-transitory computer-readable storage medium of claim 31, wherein the instructions further configure the one or more processors to cause the STA to:
if a network allocation vector (NAV) indicates idle, and if the RTS frame indicates the dynamic bandwidth, encode the CTS frame in the non-HT PPDU or the non-HT duplicate PPDU for transmission on each channel within the channel width of the RTS frame for which secondary channels are idle for the PIPS before receiving the non-HT duplicate RTS frame.

34. An apparatus of an access point (AP), the apparatus comprising: a memory; and, circuitry coupled to the memory, the circuitry configured to:
encode a request-to-send (RTS) frame in a non-high-throughput (non-HT) physical (PHY) Layer Convergence Procedure (PLCP) protocol data unit (PPDU) or non-HT duplicate PPDU, the RTS frame comprising an address of a station (STA), and wherein the RTF frame comprises a field that indicates a static bandwidth or a dynamic bandwidth;
configure the AP to transmit the RTS within a channel width;
if the RTS frame indicates the static bandwidth, and a clear-to-send (CTS) frame is received from the STA, encode a HT PPDU for transmission to the STA with the channel width; and
if the RTS frame indicates the dynamic bandwidth, and a CTS frame is received from the STA, encode a HT PPDU for transmission on each channel within the channel width where the CTS is received.

35. The apparatus of claim 34, wherein the AP is a HT AP or a HT STA, and wherein the AP is configured to operate in accordance with Institute of Electrical and Electronic Engineers (IEEE) 802.11ac.

36. The apparatus of claim 34, wherein the CTS frame comprises a bandwidth indication field indicating a bandwidth of the channel width or a bandwidth of each channel within the channel width for which the CTS frame is to be transmitted.

37. The apparatus of claim 34, wherein the circuitry is further configured to: encode a separate RTS frame on each 20 MHz channel within the channel width.

38. The apparatus of claim 37, wherein the channel width is one from the following group: 20 MHz, 40 MHz, 80 MHz, and 160 MHz.

39. The apparatus of claim 34, further comprising: one or more antennas coupled to the circuitry.

* * * * *

UNITED STATES PATENT AND TRADEMARK OFFICE
CERTIFICATE OF CORRECTION

PATENT NO. : 9,820,304 B2
APPLICATION NO. : 13/040821
DATED : November 14, 2017
INVENTOR(S) : Gong et al.

It is certified that error appears in the above-identified patent and that said Letters Patent is hereby corrected as shown below:

In the Claims

In Column 9, Line 52-53, in Claim 1, after "comprising:", insert --¶--

In Column 9, Line 53, in Claim 1, delete "and," and insert --and¶-- therefor

In Column 9, Line 61, in Claim 1, delete "(PITS)" and insert --(PIFS)-- therefor In Column 10, Line 16, in Claim 4, delete "(NAY)" and insert --(NAV)-- therefor In Column 11, Line 2, in Claim 12, delete "to;" and insert --to:-- therefor In Column 11, Line 19, in Claim 14, delete "802.1 lac." and insert --802.11ac.-- therefor In Column 11, Line 50, in Claim 18, delete "(SITS)" and insert --(SIFS)-- therefor In Column 12, Line 12, in Claim 21, delete "(PITS)" and insert --(PIFS)-- therefor In Column 12, Line 32-33, in Claim 24, after "comprising:", insert --¶--

In Column 12, Line 33, in Claim 24, delete "and," and insert --and¶-- therefor

In Column 12, Line 42, in Claim 24, delete "(PITS)" and insert --(PIFS)-- therefor In Column 12, Line 63, in Claim 27, delete "(NAY)" and insert --(NAV)-- therefor In Column 13, Line 5, in Claim 28, delete "(NAY)" and insert --(NAV)-- therefor In Column 13, Line 27, in Claim 31, delete "(PLOP)" and insert --(PLCP)-- therefor Signed and Sealed this
Fourth Day of June, 2019

Andrei Iancu
*Director of the United States Patent and Trademark Office*

CERTIFICATE OF CORRECTION (continued)
U.S. Pat. No. 9,820,304 B2

In Column 13, Line 32, in Claim 31, delete "(PIPS)" and insert --(PIFS)-- therefor In Column 14, Line 14, in Claim 34, after "comprising:", insert --¶--

In Column 14, Line 14, in Claim 34, delete "and," and insert --and¶-- therefor